United States Patent [19]

Neal

[11] Patent Number: 5,269,627
[45] Date of Patent: Dec. 14, 1993

[54] SPAR FOR OIL SPILL CONTAINING BOOM

[75] Inventor: James H. Neal, Winston-Salem, N.C.

[73] Assignee: D.S.C.A.R. International, Winston-Salem, N.C., ; SR 5 08251993 37 12141993 ZZX None 8 1 1 Taylor; Dennis L. 1 3 073130197 14

[21] Appl. No.: 930,852

[22] Filed: Aug. 14, 1992

[51] Int. Cl.⁵ .............................................. E02B 15/04
[52] U.S. Cl. ....................................... 405/70; 405/63
[58] Field of Search ...................... 405/70, 71, 69, 60, 405/63-68; 256/19, 24

[56] References Cited

U.S. PATENT DOCUMENTS

| | | | |
|---|---|---|---|
| 3,921,407 | 11/1975 | Neal | 405/66 X |
| 3,924,412 | 12/1975 | Bennett et al. | 405/70 X |
| 4,422,797 | 12/1983 | McAllister et al. | 405/70 |

Primary Examiner—Dennis L. Taylor
Attorney, Agent, or Firm—Rhodes, Coats & Bennett

[57] ABSTRACT

The boom comprises a series of mesh bands connected end-to-end by buoyant spars to form an oil-containing wall for isolating and oil spill recovery. Bands of the boom are made of oil-impermeable material and include a locking bead extending along the ends of the bands. Each band is connected between spaced spars that have an elongated cylindrical shape. An upper section of the spar includes a locking channel extending diametrically through the spar. The locking channel divides the upper section of the spar into a pair of clamping sections. Two bands are connected together by inserting an end of each band in opposite directions through a spar's locking channel such that locking beads of the two bands are positioned on opposite sides of the spar. The bands are secured in a locked position within the locking channel by pressing the clamping sections together to reduce the width of the locking channel and prevent the locking beads from passing through the locking channel.

8 Claims, 1 Drawing Sheet

SPAR FOR OIL SPILL CONTAINING BOOM

FIELD OF THE INVENTION

The present invention is related to a boom for containing an oil spill on a body of water, and more particularly, to an improved technique for joining adjacent bands by an improved connecting spar.

BACKGROUND OF THE INVENTION

Oil spills and releases of other water-borne pollutants can potentially result in grave environmental damage and health concerns. To help mitigate the adverse consequences of aquatic spills, oil-containment booms are used to isolate aquatic spills so that water-borne pollutants can be removed from the water in a pickup and skimming operation. Booms ordinarily include a series of water-permeable, oil-impermeable bands that are interconnected by buoyant spars.

To effectively isolate an oil spill, a boom must form a continuous wall that encircles the oil spill. Any discontinuity in the wall of the boom will destroy or compromise the booms ability to isolate an oil spill. In particular, the failure of a band spar connection will result in a gap in the boom that allows oil contained within the boom to escape. Accordingly, band-spar connections for connecting bands together have proven to be a critical feature in the construction and effectiveness of booms. For a boom to effectively isolate an oil spill, the band-spar connection must be secure enough to withstand the stresses placed against the boom by water and water-borne matter moving through and against the boom at speeds up to 4 knots per hour.

In addition, to the ability to withstand stresses placed against a boom, a band-spar connection should enable a user to easily detach and attach a band to a spar while the boom is deployed. During the isolation of an oil spill, it is not unusual for a band of the boom to become damaged. The band-spar connection should allow for easy detachment of the damaged band from the connecting spars and then attachment of a replacement band to the boom. Such a repair must be capable of being performed easily and quickly so that there is no serious interruption in the operation of the boom. Finally, a bandspar connection for a boom should not require a complicated design of the band or spar.

Several different prior art booms are disclosed by U.S. Pat. No. 3,921,407, issued Nov. 25, 1975; U.S. Pat. No. 5,102,261, issued Apr. 7, 1992; U.S. Pat. No. 5,102,262, issued Apr. 7, 1992; U.S. Pat. No. 4,211,659, issued Jul. 8, 1980; and U.S. Pat. No. 3,757,526, issued Sep. 11, 1973. These prior art booms do not disclose an effective and practical design for a band-spar connection that is easily detachable and that is sufficiently secure to withstand large stresses placed against the boom. For example, tests and actual use of the boom disclosed in my U.S. Pat. No. 3,921,407, issued Nov. 25, 1975, have shown that the disclosed bandspar connections will occasionally fail when large stresses are placed on the boom.

SUMMARY OF THE INVENTION

The boom of the present invention is a modified and improved version of the boom disclosed in my U.S. Pat. No. 3,921,407, issued Nov. 25, 1975. (U.S. Pat. No. 3,921,407 being incorporated herein by reference). The improvement of the present invention to the boom disclosed in my previous patent being directed to the manner in which mesh bands are detachably connected together by spars to form an oil containment wall.

The spars and bands of the boom are so designed as to provide a more effective and practical band-spar connection. In particular, each spar has a locking channel or slot extending from the spar's upper end and throughout an upper portion of the spar. The locking channel extends diametrically through the width of the boom so as to divide the upper portion of the boom into two semi-cylindrical sections; i.e., a first clamping section and a second clamping section. As a result of the channel, the clamping sections are flexible and each includes a band engagement surface that extends transversely through the cylinder and along the longitudinal length of the spar's upper portion. The band engagement surfaces define the locking channel and are positioned in spaced relation with each other.

The bands are designed to be secured to a spar's upper portion and include a locking bead which extends along the end thereof. To connect two bands together, a first band is inserted into the locking channel with its locking bead positioned outside of and adjacent the opposite end of the locking channel. The end of a second band is extended in an opposite direction through the locking channel with its locking bead positioned adjacent to the opposite end of the locking channel. If the width of the locking channel is less than the combined widths of the two bands, the locking channels will be urged outwardly slightly due to the face exerted by the combined widths of the two bands against the inside walls of the locking channel as the two bands are slid down into the locking channel. With the bands now inserted into the channel, the resilient clamping sections are pressed together causing the band engagement surfaces to clamp against the band ends extending through the locking channel. A locking cap is then positioned on the clamping sections to hold the clamping sections in a locked position. When the spar is in a locked position, the locking beads are of a size that presents passage through the locking channel, and thus, the band is secured to the spar.

Accordingly, it is an object of the present invention to provide a boom with a band-spar connection that allows for easy removal of a damaged band without series interruption in the containment process.

Another object of the present invention is to provide a boom with a band-spar connection capable of withstanding stresses placed upon the boom during an oil-containment operation.

Another object of the present invention is to provide a boom that can be economically constructed.

Other objects and advantages of the present invention will become apparent and obvious from a study of the following description and the accompanying drawings which are merely illustrative of such invention.

DETAILED DESCRIPTION OF THE DRAWINGS

DETAILED DESCRIPTION OF THE INVENTION

Figure 1:
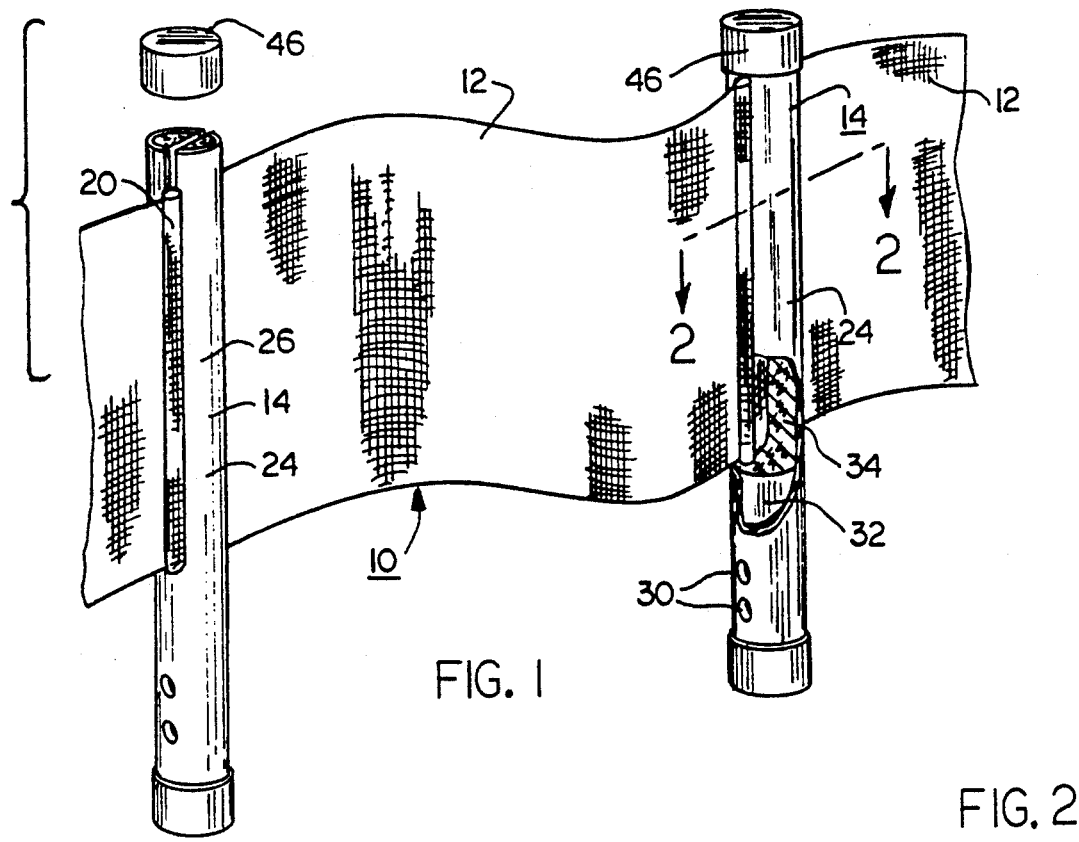
FIG. 1 is a perspective view of a section of the boom of the present invention.

Referring to the drawings, the boom of the present invention is indicated generally by the numeral 10. Boom 10 includes a series of mesh bands or curtain sections 12 connected end-to-end by spars 14.

Bands 12 are constructed with a water-permeable, oil-permeable material. One preferred material yarn used to construct fabric bands 12 is Spectra ®, an ultra high molecular weight polyethylene fiber, sold by Allied Signal, however, other fibers may also be used. Flotation spars 14 connect the bands in such a manner that the bands 12 remain upright in the water. As shown in FIG. 1, each mesh band 12 has end portions 18 that are connected to spaced spars 14. A locking bead 20 extends along ends 18 from the top edge 16 of the band to the bottom edge 17. To form the locking bead 20, a hem is formed along the ends 18 of the band 12 to form a channel therein. A cord is inserted into the hem to form the locking bead 20.

Each spar 14 includes a casing 24 having an elongated, cylindrical shape with an upper portion 26 and a lower portion 28. Casing 24 is constructed from a sturdy and resilient material such as polyethylene tubing. As shown in FIG. 1, lower portion 28 of casing 24 includes a ballast chamber 30, vent holes 32, and a lead weight (not shown). The lead weight in the lower portion 28 causes spar 14 to assume an upright position when placed in water.

The upper portion 26 of casing 24 is filled with a buoyant, water and oilimpermeable material 34, such as foamed urethane. A locking channel or slot 38 extends from the top end of spar 14 and along the longitudinal length of upper portion 26. Locking channel 38 extends diametrically through the spar's upper portion 26 from one side to the opposing side of the spar 14 so as to divide upper portion 26 into a first clamping section 40 and a second clamping section 42. First clamping section 40 and second clamping section 42 are resilient, and the channel 38 forms a mesh band engagement surface 44 in each section 40, 42. Engagement surfaces 44 extend along the length of upper portion 26 and from one side of spar 14 to the opposite side of spar 14 to form continuous opposing walls within the interior of spar 14.

Clamping sections 40 and 42 are flexible along the length thereof so as to be movable between an expanded position and a clamping position. When in an expanded position, opposed engagement surfaces 44 are spaced apart to form a locking channel 38 of sufficient width to permit insertion of a pair of overlapping band ends 18. By pressing the resilient clamping sections 40 and 42 together, engagement surfaces 44 are moved inwardly toward each other into the clamped position so as to educe the width of locking channel 38. A locking cap 46 slides over the top end of spar 14 to fix the clamping sections together in clamping arrangement. A first band 12 is inserted through the locking channel 38 such that the and 12 is adjacent to engagement surfaces 44 and locking bead 20 is disposed adjacent to locking channel 38. When finally inserted in locking channel 38, only a small portion of spar 14 extends above the top edges 16 of bands 12. A second band 12 is inserted in an opposite direction through the locking channel 38 such that the band 12 is adjacent engagement surfaces 44 and the locking bead 20 is disposed adjacent the opposite end of locking channel 38.

The clamping sections 40 and 42 are then pressed together to the clamping position so as to cause the engagement surfaces 44 to move inward and decrease the width of locking channel 38. As the engagement surfaces 44 move inward, they engage and clamp against the band ends 18 extending through locking channel 38. When pressed together, the upper ends of sections 40, 42 have a combined diameter of a size less than that of lock-on cap 46. Lock-on cap 46 slides over the top of spar 14 to maintain the first section 40 and second section 42 in a clamping position such that bands 12 are locked to spar 14. When released, the sections 40, 42 spread slightly to tightly engage the inner wall of cap 46.

Figure 2:
FIG. 2 is a cross-sectional view of a spar illustrating a pair of adjacent fabric bands in a locked position.
Figure 3:
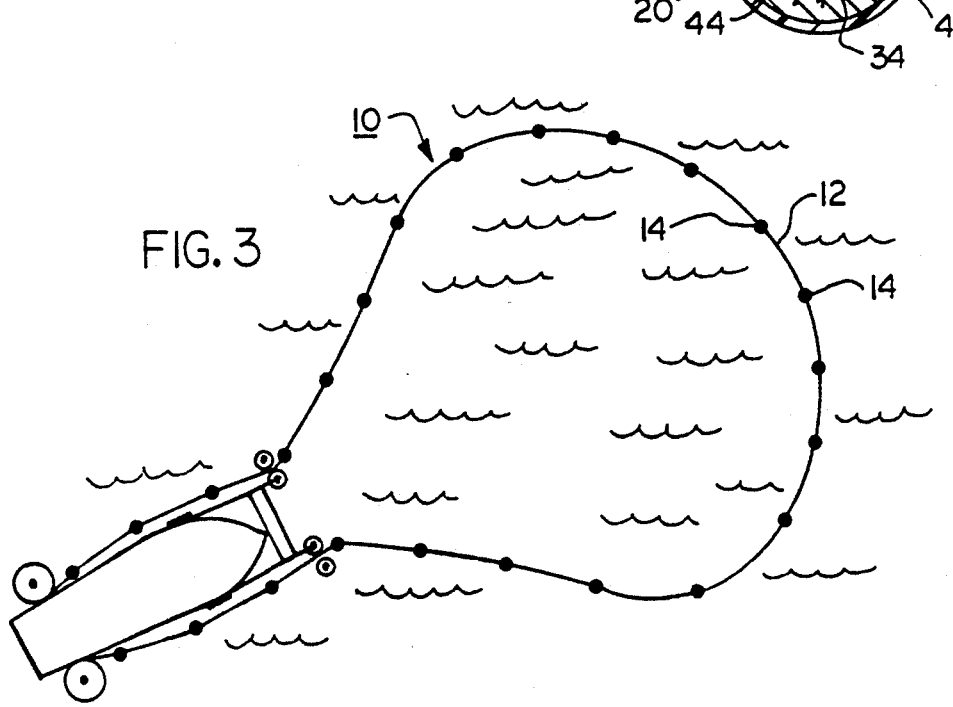
FIG. 3 is a top plan view of the boom in operation.

FIG. 2 shows a cross-section of the spar 14 and attached band ends 18 in a collapsed or clamped position. As shown by FIG. 2, engagement sections 44 extend across the full diameter of spar 14, and thus, a large surface area of spar 14 contacts and frictionally engages band end 18. Engaging a band end 18 across the entire diameter of a spar 14 improves the frictional engagement between a spar 14 and a band 12. In addition, the positioning and size of locking beads insure the locking arrangement between the band 12 and spar 14. In particular, the relatively large size of locking beads 20 prevents the beads from passing through locking channel 38 while clamping sections 40 and 42 are in a clamping relationship. Thus, the frictional engagement between the engagement surfaces 44 and band 12, and the locking bead 38 work in connection to secure a band 12 to a spar 14. These two engagement means work in conjunction and eliminate the need to provide a reinforced spar 14.

In operation, boom 10 may be quickly deployed at an oil spill site by some type of boat or tow craft. The boom is extended to encircle and isolate an oil or other pollutant spill. The band-spar connections provide a connection between the connected bands 12 that is sufficiently secure to withstand the stresses placed upon the boom 10 at speeds even up to 4 knots per hour. In the event that a band 12 is damaged during operation, boom 10 is designed so that the damaged band 12 is replaceable without serious interruption in the clean-up Operation. To replace a damaged band 12, lock-on caps 46 are slid off the ends of the pair of spars 14 connecting the damaged band 12. The clamping sections 40 and 42 of the spars 14 move outwardly upon removal of caps 46 to position the clamping sections 40 and 42 in an expanded position. The damaged band 12 is then easily removed from locking channel 38, and a replacement band 12 is slid into locking channels 38. Lock-on caps 46 are then placed on to position clamping sections 40 and 42 in a clamping position to lock the band 12 to the connecting spars 14 such that boom 10 again forms a continuous wall for isolating the oil spill.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. An oil-containing boom comprising:
   (a) a plurality of water-previous, oil-impervious mesh bands, each of said band having an elongated mesh section with two ends, a locking bead extending along at least a portion of said band ends;

(b) a plurality of spaced connecting spars connectable to said band ends so as to form a containment wall, each said spar having an elongated body with a top end and a bottom end;

(c) a locking channel extending diametrically and completely through an upper portion of a said spar so that the channel extends the entire diameter of the spar, said locking channel dividing said spar's upper portion into first and second clamping sections having opposed band engagement surfaces disposed along said locking channel; and (d) said opposed and engagement surfaces positionable between an expanded position for inserting a said band end and a clamping position for locking a said band end to said spar, wherein said band end is insertable through said locking channel when said band engagement surfaces are in the expanded position, and wherein when said band engagement surfaces are in the clamping position, said band end extends through said locking channel and said locking bead is positioned adjacent a side of said spar and sized so as to prevent said band end from being pulled through said locking channel.

2. The oil-containing boom of claim 1 wherein said first and second clamping sections are flexible.

3. The oil-containing boom of claim 1 wherein said band engagement sections ar substantially continuous along said locking channel and clamp against a substantial portion of said band end extending through said locking channel.

4. A connecting spar for connecting band sections of an oil spill containment boom of the type wherein band sections have enlarged end portions, each of said connecting spar comprising:

(a) an elongated body portion having a top end and a bottom end;

(b) a locking channel extending diametrically through an upper portion of said spar, said locking channel dividing said spar's upper portion into first and second clamping sections having opposed band engagement surfaces disposed along said locking channel; and (c) said opposed and engagement surfaces positionable between an expanded position for inserting a said band end and a clamping position for locking a said band end to said spar, wherein said band end is insertable through said locking channel when said band engagement surfaces are in the expanded position, and wherein when said band engagement surfaces are in the clamping position, said band extends through said locking channel and said locking bead is positioned adjacent a side of said spar and sized so as to prevent said band from being pulled through said locking channel.

5. The oil-containing boom of claim 4 wherein said band engagement sections are substantially continuous along said locking channel and clamp against a substantial portion of said band end extending through said locking channel so as to lock said band end to said spar.

6. The oil-containing boom of claim 4 further including a lock-on cap insertable over said top end of said spar for maintaining said first and second clamping sections in said clamping position.

7. A water-pervious, oil-impervious mesh band for oil containment booms of the type where a plurality of slotted connecting spars having a locking channel therein connect a series of mesh oil containment bands, wherein said mesh band comprises:

a) an elongated mesh section formed of a waterpervious oil-impervious materials with two ends;

b) a locking bead extending along at least a portion of each of said band ends;

c) whereby said mesh section of said band is insertable through said slot in said connecting spar and said locking bead is so sized and shaped as to prevent the end of said band from being pulled through said locking channel.

8. The oil-containing boom of claim 1 and further including a lock-on cap insertable over said top end of said spar for maintaining said first and second sections in said clamping position.

* * * * *

UNITED STATES PATENT AND TRADEMARK OFFICE
CERTIFICATE OF CORRECTION

PATENT NO. : 5,269,627
DATED : December 14, 1993
INVENTOR(S) : James H. Neal

It is certified that error appears in the above-indentified patent and that said Letters Patent is hereby corrected as shown below:

On the title page, the name of the Assignee is misspelled as "D.S.C.A.R. International" and should be corrected to --O.S.C.A.R International--;

In Claim 1, column 4, line 67, change "water-previous" to --water-pervious--; in column 5, line 14, change "and engagement" to --band engagement--; in column 6, line 3, change "and engagement" to --band engagement--.

Signed and Sealed this

Twelfth Day of July, 1994

Attest:

BRUCE LEHMAN

Attesting Officer     Commissioner of Patents and Trademarks